June 29, 1926.
C. H. MONTAGUE
1,590,695
AUTOMOBILE HEADLIGHT
Filed Dec. 6, 1923
2 Sheets-Sheet 1
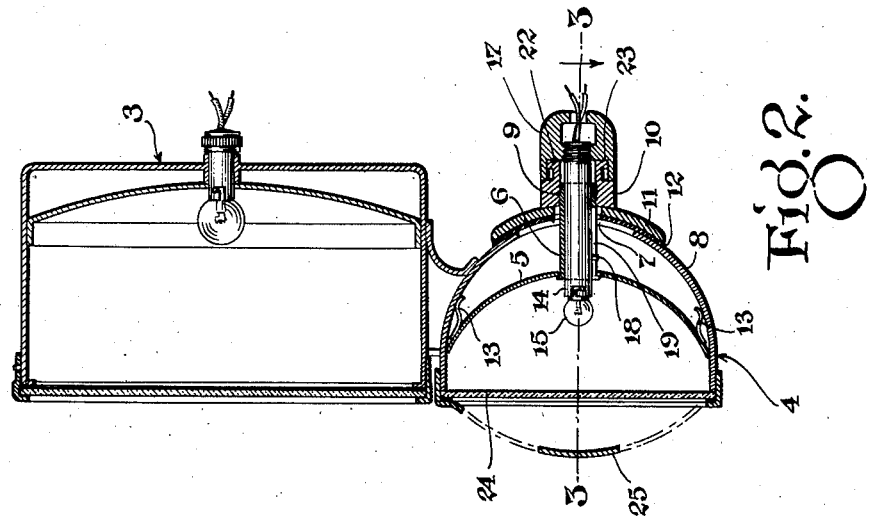
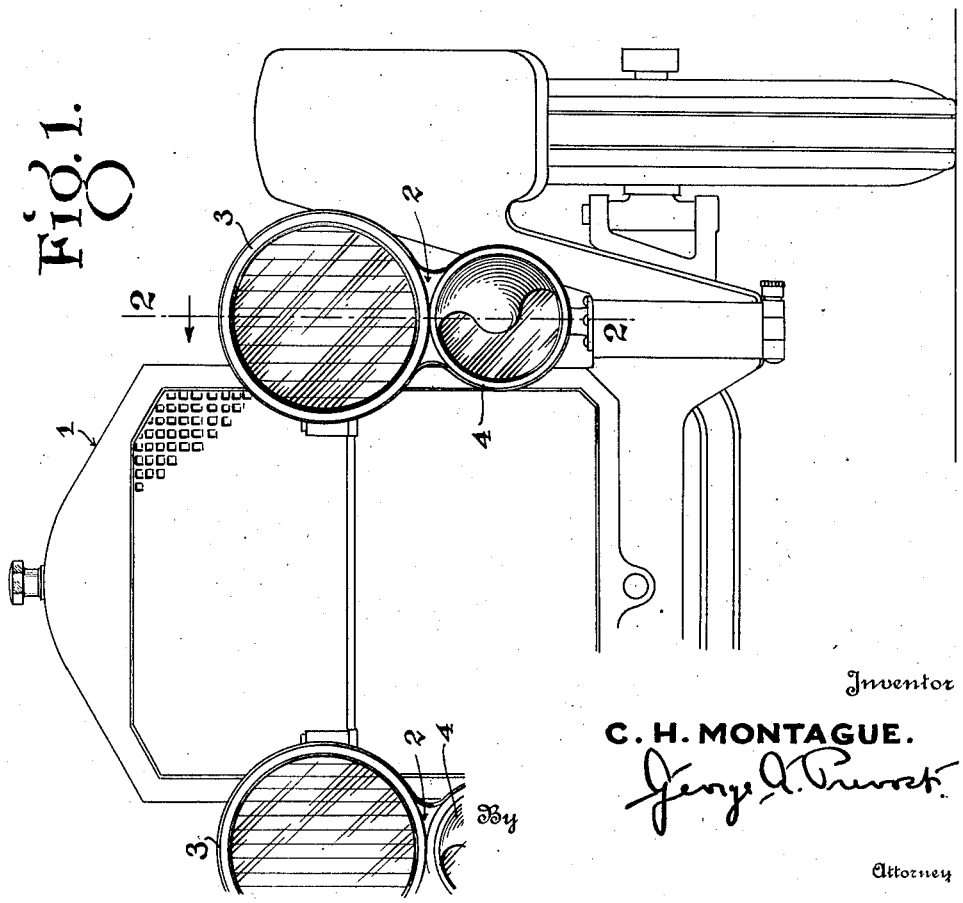
Inventor
C. H. MONTAGUE.

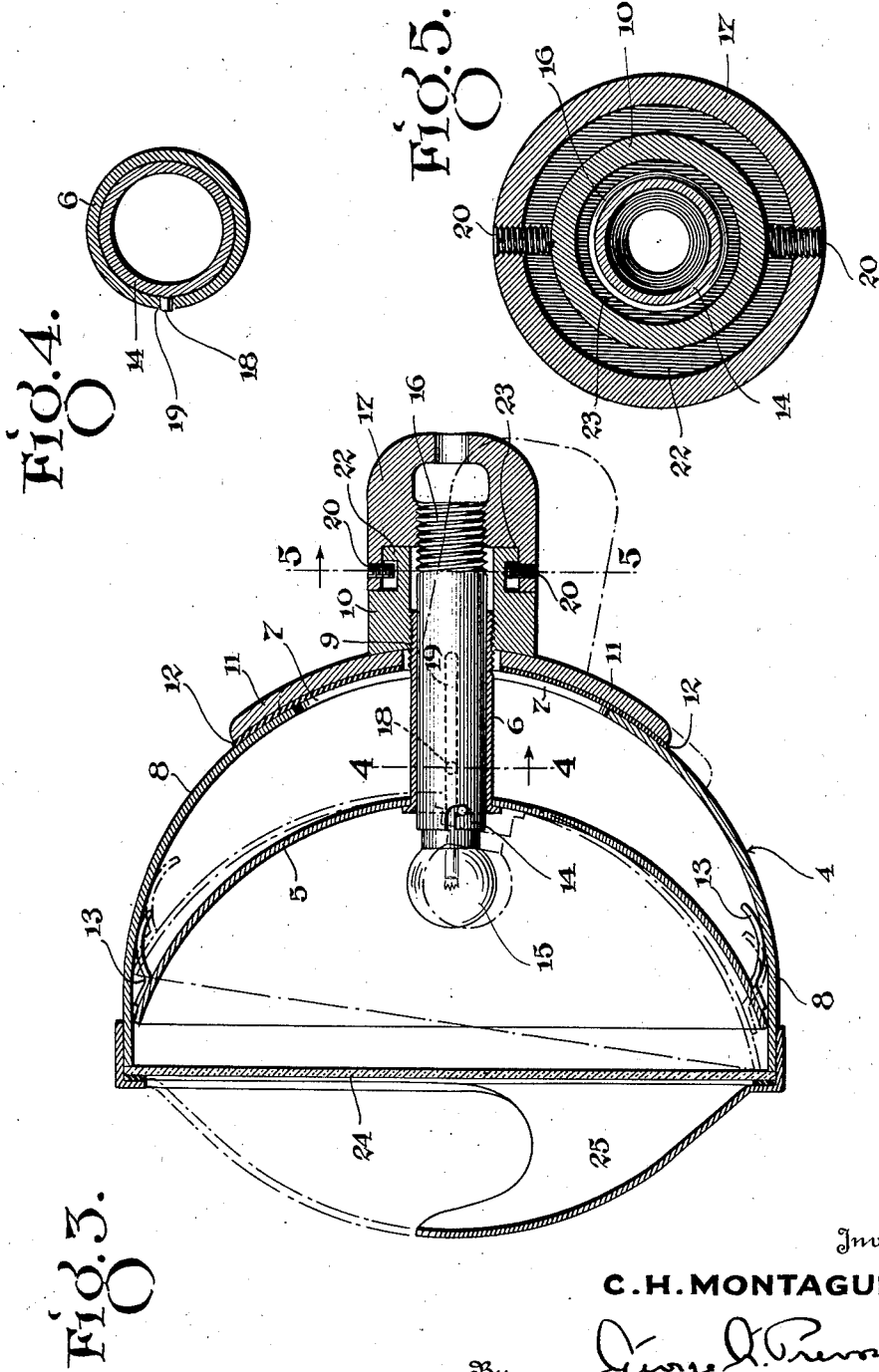

Patented June 29, 1926.

1,590,695

UNITED STATES PATENT OFFICE.

CARROLL H. MONTAGUE, OF RICHMOND, VIRGINIA, ASSIGNOR TO SAF-DE-LITE COMPANY, INC., OF PHILADELPHIA, PENNSYLVANIA, A CORPORATION OF VIRGINIA.

AUTOMOBILE HEADLIGHT.

Application filed December 6, 1923. Serial No. 678,955.

My invention relates to automobile lights and consists in certain new and useful improvements of the invention shown and described in my prior Patent No. 1,448,635 of March 13, 1923.

The object of this invention is to produce a combination vehicle headlight and spot light, as in my prior patent, with means whereby the spot light may be focused to the desired degree and its rays directed without altering the position of either the headlight or the spot light.

Another object of my invention is to provide a lighting system for motor vehicles, consisting of a main headlight which will throw its rays straight ahead, and a spot light integral therewith, which is adapted to be turned on in place of the headlight when approaching another vehicle, and which will throw its rays downwardly and to one side only of the path of movement of the vehicle, so that no direct rays will reach the eyes of the operator of the approaching vehicle.

Another object of my invention is to enable the bulb socket of the spot light to be regulated by means of a lock nut.

All of these adjustments may be made without removing the lights from the vehicle or changing their position thereon.

With the above objects outlined and other objects in view which will appear as the description proceeds, the invention consists in the novel features hereinafter described in detail, illustrated in the accompanying drawings and more particularly pointed out in the appended claims.

Referring to the drawings:

Fig. 1 is a front view of my improved combination headlight and spot light in place on a vehicle.

Fig. 2 is a sectional view taken on line 2—2 of Fig. 1, showing the adjustable reflector and bulb in the spot light below the head light.

Fig. 3 is an enlarged sectional view taken on line 3—3 of Fig. 2, showing in dotted lines, the reflector adjusted to one side.

Fig. 4 is an enlarged view of the lamp socket, taken on line 4—4 of Fig. 3.

Fig. 5 is an enlarged view in section taken on line 5—5 of Fig. 3, showing the locking means for the reflector and bulb.

In the drawings 1 represents a motor vehicle to either side of the front of which is secured my improved combination headlight and spot light 2, which consists of an ordinary headlight 3 and a spot light 4 integral therewith and below the said headlight, as in my Patent No. 1,448,635.

The present invention resides in providing an adjustable reflector 5 having an elongated sleeve 6 crimped to the central portion thereof and which projects through a circular orifice 7 in the shell 8 of the light. The end of the sleeve 6 is threaded as at 9, to engage the reflector lock nut 10. Behind the shell 8 and covering the orifice 7 is a circular plate 11, slidable on the shell, and which is provided with a slot slightly larger in diameter than the sleeve, to enable said sleeve to pass therethrough. This plate also serves as a bearing for the reflector lock nut 10. The orifice 7 is of such a size as to permit the sleeve 6 and with it the reflector, to be moved at least ten degrees off center in any direction, as shown in Fig. 3, in order to throw the rays of light to the desired position on the road. In order to prevent the scratching of the paint on the shell of the spot light when the plate 11 is moved thereon, I provide a pad 12 of a soft material, which also excludes any moisture from the inside of the light.

As the reflector is not rigidly secured to the shell 8 in order to obviate rattling of the parts, I provide a set of springs 13, which are secured to the reflector pressing against shell and holding the reflector in place.

A bulb socket 14 is formed to fit into and project beyond each end of the sleeve 6, the inner end being adapted to receive a bulb 15, and the other end threaded as at 16, to engage the adjusting nut 17. On one side of the socket 14, I insert a pin 18, which slides in a groove 19, provided in the sleeve 6 to prevent the socket from turning with the nut 17. When the said nut is turned the socket moves in or out until the correct focal adjustment for the spot light is obtained.

The nut 10 is recessed at 21 and provided with a shoulder 22, and the nut 17 is recessed as at 23 to receive the recessed portion and shoulder of nut 10. This gives the appearance of one nut, and when the desired adjustment is obtained on the bulb socket 14, set screws 20 in the inner end of the nut 17, are tightened and lock the two nuts 10 and 17 together and prevent the movement of the latter. To adjust the nut 10, it is necessary to use a wrench in order to render the reflector secure, but by the use of the set screws 20 the nut 17 may be adjusted by hand.

The front of the spot light is provided with the usual lens 24, and on one side with a shield 25 as in my patent heretofore mentioned. This shield may be on either side, according to the direction in which the light is to be thrown.

To adjust the light, the procedure is as follows:

First, the set screws 20 are loosened, then with a wrench, the reflector lock nut 10 is retracted until the reflector can be moved freely in any direction. By means of the two nuts in the rear of the light, which serve as a handle, the reflector is adjusted to the desired degree, and the nut 10 is tightened, which pulls the reflector 5 and reflector springs 13 tightly against the inner side of the shell. Then while the set screws 20 are still loose, the nut 17 is turned to either right or left to advance or retract the bulb socket 14 until the proper focal length is secured, and the screws 20 are tightened to lock the adjustment.

From the foregoing, it is believed that my invention can be clearly understood without further description, and in closing I may state that obvious changes in the details of construction may be resorted to without departing from the spirit of the invention as set forth in the appended claims.

What I claim and desire to secure by Letters Patent is:—

1. A vehicle lamp comprising a casing, a reflector adjustable in any direction in said casing, said reflector having an extended sleeve threaded at its free end secured thereto, a bulb socket longitudinally adjustable in said sleeve, said socket also being threaded at one end, a nut adapted to be screwed on the threaded end of said sleeve for adjusting said reflector and a second nut adapted to be screwed on the threaded end of said bulb socket and adapted to fit over the end of said sleeve nut for adjusting said bulb socket longitudinally and means for locking said nuts when the desired position is obtained.

2. A vehicle lamp as claimed in claim 1 wherein said bulb socket nut and said sleeve nut present an integral appearance.

3. A vehicle lamp comprising a main headlight, a spot light integral therewith, a reflector in said spot light having an extended sleeve secured thereto and projecting through an orifice in the shell of said spot light, a plate covering said orifice and engaging said sleeve, one end of said sleeve being threaded, a reflector lock nut threaded on said sleeve end, a bulb socket formed to fit in said sleeve and adapted to slide therein, one end of said bulb socket being threaded, a lock nut threaded on said last named sleeve, said lock nut being recessed to receive a reduced portion of the reflector lock nut and being provided with set screws which engage a shoulder in said reflector lock nut and which when tightened prevent the movement of said bulb socket and springs interposed between said reflector and the lamp shell.

In testimony whereof I affix my signature.

CARROLL H. MONTAGUE.